United States Patent
Ni et al.

(10) Patent No.: US 10,621,788 B1
(45) Date of Patent: Apr. 14, 2020

(54) RECONSTRUCTING THREE-DIMENSIONAL (3D) HUMAN BODY MODEL BASED ON DEPTH POINTS-TO-3D HUMAN BODY MODEL SURFACE DISTANCE

(71) Applicant: SONY CORPORATION, Tokyo (JP)

(72) Inventors: Jie Ni, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/140,634

(22) Filed: Sep. 25, 2018

(51) Int. Cl.
  G06T 19/00 (2011.01)
  G06T 7/50 (2017.01)
  G06T 7/33 (2017.01)
  G06K 9/00 (2006.01)
  G06T 19/20 (2011.01)

(52) U.S. Cl.
  CPC ........ G06T 19/006 (2013.01); G06K 9/00268 (2013.01); G06T 7/337 (2017.01); G06T 7/50 (2017.01); G06T 19/20 (2013.01); G06T 2200/08 (2013.01); G06T 2207/30196 (2013.01)

(58) Field of Classification Search
  None
  See application file for complete search history.

(56) References Cited

U.S. PATENT DOCUMENTS

| | | | |
|---|---|---|---|
| 9,001,118 B2 | 4/2015 | Molyneaux et al. | |
| 9,524,582 B2 | 12/2016 | Ma et al. | |
| 2004/0175039 A1* | 9/2004 | Miller | G06K 9/00208 382/181 |
| 2014/0328519 A1* | 11/2014 | Martinetz | G06T 7/251 382/107 |
| 2015/0206003 A1* | 7/2015 | Haker | G06K 9/00369 345/420 |
| 2015/0310673 A1 | 10/2015 | Romdhani | |

FOREIGN PATENT DOCUMENTS

GB  2389500 A  12/2003

OTHER PUBLICATIONS

Alexander Weiss, David Hirshberg, Michael J. Black, "Home 3D Body Scans from Noisy Image and Range Data", Nov. 13, 2011, IEEE, 2011 International Conference on Computer Vision, pp. 1951-1958.*

Ye, et al., "Accurate 3D Pose Estimation From a Single Depth Image", 08 pages.

* cited by examiner

Primary Examiner — Robert Bader
(74) Attorney, Agent, or Firm — Chip Law Group

(57) ABSTRACT

Virtual reality-based apparatus that includes a memory, a depth sensor and circuitry. The depth sensor captures a plurality of depth data points of a human subject from a single viewpoint. The memory stores a deformed three-dimensional (3D) human body model. The circuitry calculates first distances from the depth data points to a plurality of triangular faces. The circuitry calculates second distances from the depth data points to a plurality of edges. The circuitry further calculates third distances from the depth data points to a plurality of vertices. The circuitry further determines minimum distances, among the calculated first distances, the calculated second distances, and the calculated third distances, as point-to-surface distance to reconstruct a 3D human body model with high accuracy.

18 Claims, 7 Drawing Sheets

RECONSTRUCTING THREE-DIMENSIONAL (3D) HUMAN BODY MODEL BASED ON DEPTH POINTS-TO-3D HUMAN BODY MODEL SURFACE DISTANCE

CROSS-REFERENCE TO RELATED APPLICATIONS/INCORPORATION BY REFERENCE

None.

FIELD

Various embodiments of the disclosure relate to three-dimensional (3D) modeling technologies. More specifically, various embodiments of the disclosure relate to reconstruction of 3D human body model based on calculation of point-to-surface distances, for example, distances of depth data points to the surface of the 3D human body model.

BACKGROUND

Advancements in the field of three-dimensional (3D) computer graphics and 3D human body modeling, have provided the ability to create 3D human body models and visualize objects in a 3D computer graphics environment. Typically, a 3D stereo capture system may be utilized to reconstruct a full 3D human body model of a human body. The 3D stereo capture system may include multiple stereo cameras that capture the human body from a plurality of viewpoints. However, such 3D stereo capture systems are expensive and may be undesirable for daily applications. In certain scenario, attempts have been made to use depth data points captured by a depth sensor from a single viewpoint to reconstruct a full 3D human body model of the human body. In such scenario, a point-to-point distance, as a distance metric, may be used to calculate a distance from a depth data point to a point in a deformed 3D human model. The point-to-point distance may be used in order to minimize the point-to-point distance between the depth data point and the deformed 3D human model to further reconstruct the full 3D human body model. However, in such cases, the calculation of the point-to-point distance may not be accurate for different resolution of vertices. As a consequence, the reconstruction of the full 3D human body model using the point-to-point distance may be inaccurate when the resolution of vertices on the deformed 3D human model is reduced. Such inaccuracy in the reconstruction of the 3D human model of the human body may be undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for reconstructing three-dimensional (3D) human body model based on depth points-to-3D human body model surface distance is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus for reconstructing three-dimensional (3D) human body model by calculating point-to-surface distances on a deformed three-dimensional (3D) human body model of a human subject. Exemplary aspects of the disclosure provide a VR based apparatus that includes a memory, a depth sensor, and circuitry. The memory may be configured to store the deformed 3D human body model of the human subject. The deformed 3D human body model may need to be optimized for accurate reconstruction of the 3D human body model of the human subject. The depth sensor of the VR based apparatus may be configured to capture a plurality of depth data points of the human subject from a single viewpoint. The memory may be further configured to store the plurality of depth data points of the human subject captured by the depth sensor. The memory may be further configured to store a reference 3D human body model which comprises a mean body shape. The circuitry of the VR based apparatus may be configured to generate the deformed 3D human body model based on deformation of the stored reference 3D human body model.

In contrast to the conventional systems, the disclosed VR-based apparatus may be configured to reconstruct the 3D human body model based on calculation of point-to-surface distances between the plurality of depth data points and a surface of the deformed 3D human body model. In accordance with an embodiment, the surface of the deformed 3D human body model includes a plurality of triangular faces, a plurality of edges and a plurality of vertices. The calculated point-to-surface distances may accurately represent minimum distances between the depth data points and the surface of the deformed 3D human body model. The calculated point-to-surface distances may be utilized in accurate reconstruction of the 3D human body model of the human subject even when a resolution of the plurality of vertices on the deformed 3D human body model is reduced below a specific threshold during a rendering state of the 3D human body model on a display device. Further, as the plurality of depth data points of the human subject are captured from the single viewpoint from the single depth sensor, the computational cost for the reconstruction of a full body 3D human body model of the human subject is also reduced. Thus, the disclosed apparatus is cost-effective and capable of reconstructing the full 3D human body model with higher accuracy using the point-to-surface distances between the captured plurality of depth data points and the surface of the deformed 3D human body model.

Figure 1:
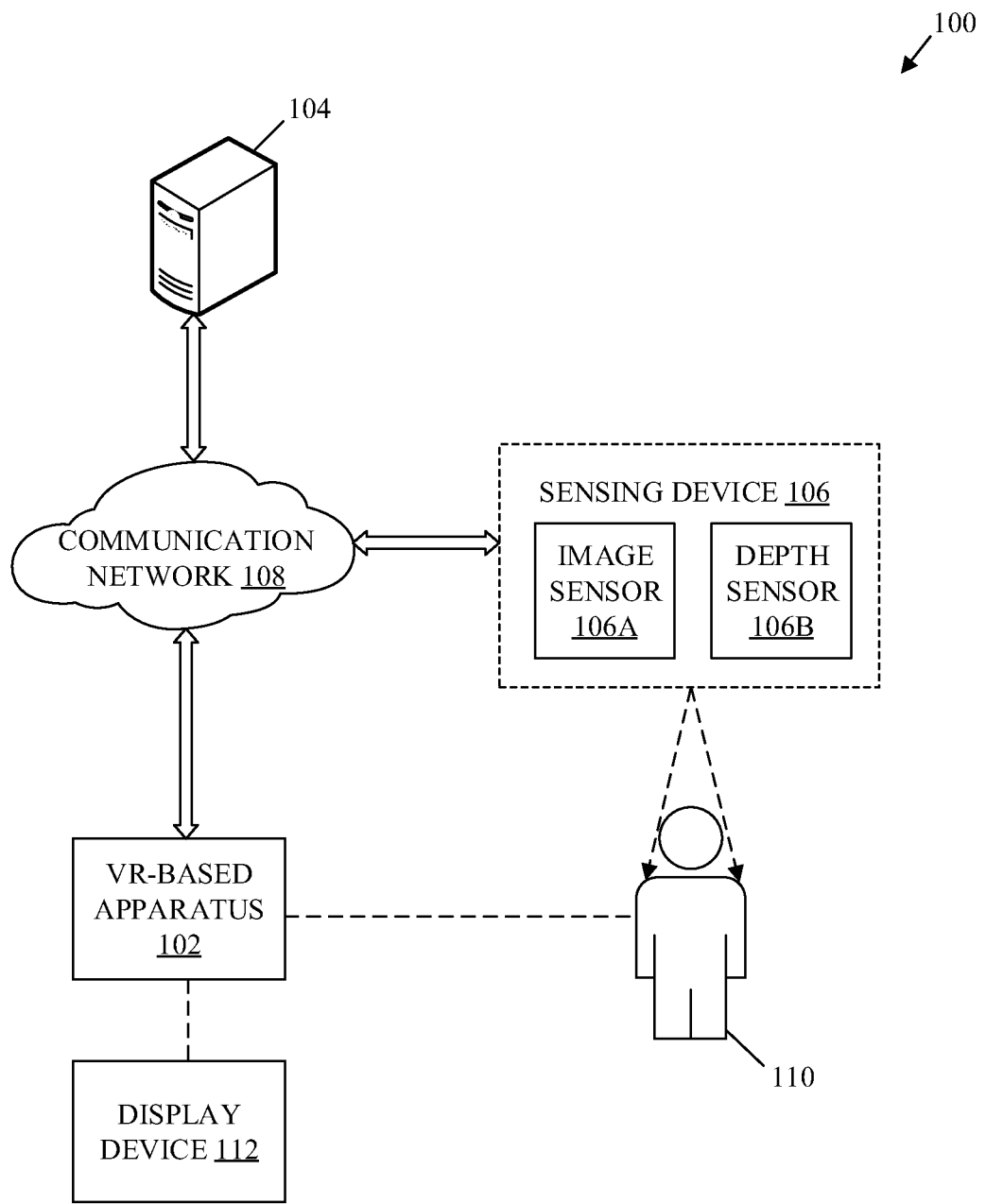
FIG. 1 is a block diagram that illustrates an exemplary network environment for reconstructing three-dimensional (3D) human body model based on depth points-to-3D human body model surface distance, in accordance with an embodiment of the disclosure.

FIG. 1 is a block diagram that illustrates an exemplary network environment for reconstructing 3D human body model based on depth points-to-3D human body model surface distance, in accordance with an embodiment of the disclosure. With reference to FIG. 1, there is shown a network environment 100. The network environment 100 may include a Virtual Reality (VR)-based apparatus 102, a server 104, a sensing device 106 a communication network 108, and a display device 112. The sensing device 106 may include an image sensor 106A and a depth sensor 106B. A human subject 110, that is to be modeled, may be associated with the VR-based apparatus 102. The VR-based apparatus 102 may be communicatively coupled to the server 104, the display device 112, and the sensing device 106, via the communication network 108.

The VR-based apparatus 102 may comprise suitable logic, circuitry, and interfaces that may be configured to reconstruct the 3D human body model of the human subject 110. The VR-based apparatus 102 may be configured to reconstruct 3D human body model of the human subject 110 based on a plurality of depth data points of the human subject 110 captured by the depth sensor 106B from a single viewpoint. The VR-based apparatus 102 may be configured to determine point-to-surface distances between the depth data points and a surface of the deformed 3D human body model for reconstruction of the 3D human body model of the human subject 110. Examples of the VR-based apparatus 102 may include, but are not limited to, a video-conferencing system, an augmented reality-based device, a gaming device, a computing device, a mainframe machine, a server, a computer work-station, and/or a consumer electronic (CE) device.

The server 104 may comprise suitable logic, circuitry, and interfaces that may be configured to store a reference 3D human body model. In some embodiments, the server 104 may be further configured to store the plurality of depth data points of the human subject 110 captured by the depth sensor 106B from the single viewpoint. The server 104 may be configured to store a deformed 3D human body model of the human subject 110 that is to be modeled. The deformed 3D human body model may be generated based on the reference 3D human body model and the plurality of depth data points of the human subject 110. The server 104 may be configured to transmit the stored deformed 3D human body model of the human subject 110 to the VR-based apparatus 102, via the communication network 108.

In some embodiments, the server 104 may be implemented as a cloud server, which may be utilized to execute aforementioned operations of the server 104 through web applications, cloud applications, HTTP requests, repository operations, file transfer, gaming operations, and the like. Other examples of the server include, but are not limited to a database server, a file server, a web server, an application server, a mainframe server, or other types of server.

The sensing device 106 may comprise suitable logic, circuitry, and interfaces that may be configured to capture the plurality of images and the plurality of depth data points of the human subject 110 from a single viewpoint. The image sensor 106A of the sensing device 106 may be further configured to capture the plurality of images of the human subject 110 from the single viewpoint. The depth sensor 106B of the sensing device 106 may be configured to capture the plurality of depth data points of the human subject 110 from the single viewpoint in real time. The sensing device 106 may be configured to transmit the captured plurality of depth data points and the captured plurality of images of the human subject 110 to the VR-based apparatus 102, via the communication network 108. In some embodiments, the sensing device 106 may comprise a plurality of sensors, such as a combination of a depth sensor, a color sensor, (such as a red-green-blue (RGB) sensor), and/or an infrared (IR) sensor which may capture the human subject 110 from the single viewpoint. Examples of the sensing device 106 may include, but are not limited to, the depth sensor, the RGB sensor, the IR sensor, a 3D-mesh structure generator used to move an object, an image sensor, or a motion-detector device.

The communication network 108 may include a communication medium through which the VR-based apparatus 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The human subject 110 may refer to an object-of-interest whose 3D human body model is to be generated. The human subject 110 may be a human or a robot that may resemble a real human. The human subject 110 may be associated with the sensing device 106 and VR-based apparatus 102.

The display device 112 may comprise suitable logic, circuitry, and interfaces that may be configured to display of the reconstructed 3D human body model of the human subject 110. The display device 112 may be integrated with the VR-based apparatus 102. In some embodiments, the display device 112 may be an external device that is communicatively coupled to the VR-based apparatus 102. The display device 112 may be realized through several known technologies such as, but not limited to, at least one of a Liquid Crystal Display (LCD) display, a Light Emitting Diode (LED) display, a plasma display, or an Organic LED (OLED) display technology, or other display devices, such as a display of a head mounted device (HMD).

In operation, the image sensor 106A of the sensing device 106 may be configured to capture the plurality of images of the human subject 110 from a single viewpoint. In accordance with an embodiment, the captured plurality of images may be a plurality of color images of the human subject 110. The sensing device 106 may further comprise the depth sensor 106B which may be configured to capture the plurality of depth data points of the human subject 110 from the single viewpoint. The captured plurality of depth data points may include values of "Z" coordinates of the human subject 110 in a 3D coordinate system from the single viewpoint. The human subject 110 may be at rest or in motion at the time of capture of the plurality of images and the plurality of depth data points. In some embodiments, the captured plurality of images of the human subject 110 may be stored as a point cloud in the memory. The point cloud may refer to a set of points in 3D space captured from the sensing device 106.

In accordance with an embodiment, the VR-based apparatus 102 may be configured to retrieve the deformed three-dimensional (3D) human body model of the human subject 110 and the plurality of depth data points of the human subject 110 from a memory of the VR-based apparatus 102. In some embodiments, the VR-based apparatus 102 may be configured to receive the deformed 3D human body model of the human subject 110 from the server 104. The deformed 3D human body model may a triangular polygonal mesh model. The generation of the deformed three-dimensional (3D) human body model of the human subject 110, is described, for example, in FIG. 2. The VR-based apparatus 102 may be configured to determine three types of distances from a given data point, for example, a depth data point, captured by the depth sensor 1068, to the surface of the deformed 3D human body model. The determined three types of distances may be used to reconstruct a realistic 3D human body model that exhibits and mimics deformation that is same or near same as the captured deformation (i.e., a change in a pose of the human subject 110 indicated by depth data points) by the single depth sensor, such as the depth sensor 106B. The surface of the deformed 3D human body model may include a plurality of triangular faces, a plurality of edges, and a plurality of vertices. The surface of the deformed 3D human body model of the human subject 110, is described in details, for example, in FIG. 3A.

In accordance with an embodiment, the VR-based apparatus 102 may be configured to calculate a first distance from a depth data point, of the plurality of the depth data points, to a triangular face of the plurality of triangular faces of the deformed 3D human body model. The VR-based apparatus 102 may be configured to determine a first point of projection of the depth data point on a plane of the triangular face based on the calculated first distance. The determined first point of projection of the depth data point may lie inside or outside the plane of the triangular face. In accordance with an embodiment, the calculated first distance may be considered a valid point-to-triangle face distance when the determined first projection point lies inside the triangular face. The calculation of the first distance and the determination of the first point of projection of the depth data point on the plane of the triangular face of the first deformed 3D human body model is described in details, for example, in FIGS. 3A and 3B.

In accordance with an embodiment, the VR-based apparatus 102 may be configured to determine a second point of projection, of the depth data point, on an edge of the plurality of edges of the deformed 3D human body model. Such determination of the second point of projection may be based on a projection coefficient and coordinates of end points of the edge. The end points of the edge correspond to two vertices of the plurality of vertices of the deformed 3D human body model. In accordance with an embodiment, the VR-based apparatus 102 may be configured to calculate a second distance from the depth data point to the edge, based on the determined second point of projection. The determined second point of projection of the depth data point may or may not be present between the end points of the edge. In accordance with an embodiment, the calculated second distance may be considered as a valid point-to-edge distance for the reconstruction of the 3D human body model when the determined second point of projection is present between the end points of the edge. The calculation of the second distance and the determination of the second point of projection of the depth data point on the edge of the first deformed 3D human body model is described in details, for example, in FIGS. 3A and 3B.

In accordance with an embodiment, the VR-based apparatus 102 may be further configured to calculate a third distance from the depth data point to a vertex of the plurality of vertices of the deformed 3D human body model. In accordance with an embodiment, the VR-based apparatus 102 may be further configured to determine a minimum distance, among the calculated first distance, the calculated second distance, and the calculated third distance, between the depth data point and the surface of the deformed 3D human body model. In accordance with an embodiment, the calculated first distance is considered valid for the determination of the minimum distance when the first point of projection of the depth data point may lie inside the plane of the triangular face. Similarly, the calculated second distance is considered valid for the determination of the minimum distance when the second point of projection is present between the end points of the edge.

In accordance with an embodiment, the determined minimum distance may correspond to a point-to-surface distance between the depth data point and a portion of the surface of the deformed 3D human body model of the human subject 110. Similar to the calculation of the first distance, the second distance, and the third distance for one depth point and corresponding triangular face, edge, and vertex, the VR based apparatus 102 may be configured to determine a plurality of the point-to-surface distances between the plurality of depth data points, and the plurality of triangular faces, the plurality of edges and the plurality of vertices of the deformed 3D human body model.

In accordance with an embodiment, the determined plurality of the point-to-surface distances may be utilized to refine the deformed 3D human body model of the human subject 110. This refinement of the deformed 3D human body model may not be based on calculation of point-to-point distance (between the depth data point and the vertex alone on the surface of the 3D human body model or the point cloud) which may not be accurate in the reconstruction of the 3D human body model when resolution of the vertex, on the surface of the deformed 3D human body model, decreases. Therefore, calculation of the three distances (namely the first distance, the second distance and the third distance) to determine point-to-surface distances (as minimum distances) between the depth data point and the surface of the deformed 3D human body model ensures accurate reconstruction of the 3D human body model despite of the reduction in the resolution of the vertices on the deformed 3D human body model below the defined threshold. The VR-based apparatus 102 may be configured to reconstruct the 3D human body model of the human subject 110 based on the determined plurality of the point-to-surface distances between the plurality of depth data points and the surface of the deformed 3D human body model.

In accordance with an embodiment, the VR-based apparatus 102 may be configured to control the display device 112 to display of the reconstructed 3D human body model of the human subject 110 such that the plurality of point-to-surface distances between the plurality of depth data points and the surface of the deformed 3D human body model is minimized during the display of the reconstructed 3D model of the human subject on the display device 112. The reconstructed 3D human body model of the human subject 110 may be generated at a low computational cost as a result of utilization of the plurality of depth data points captured by the depth sensor 106B from the single viewpoint.

Figure 2:
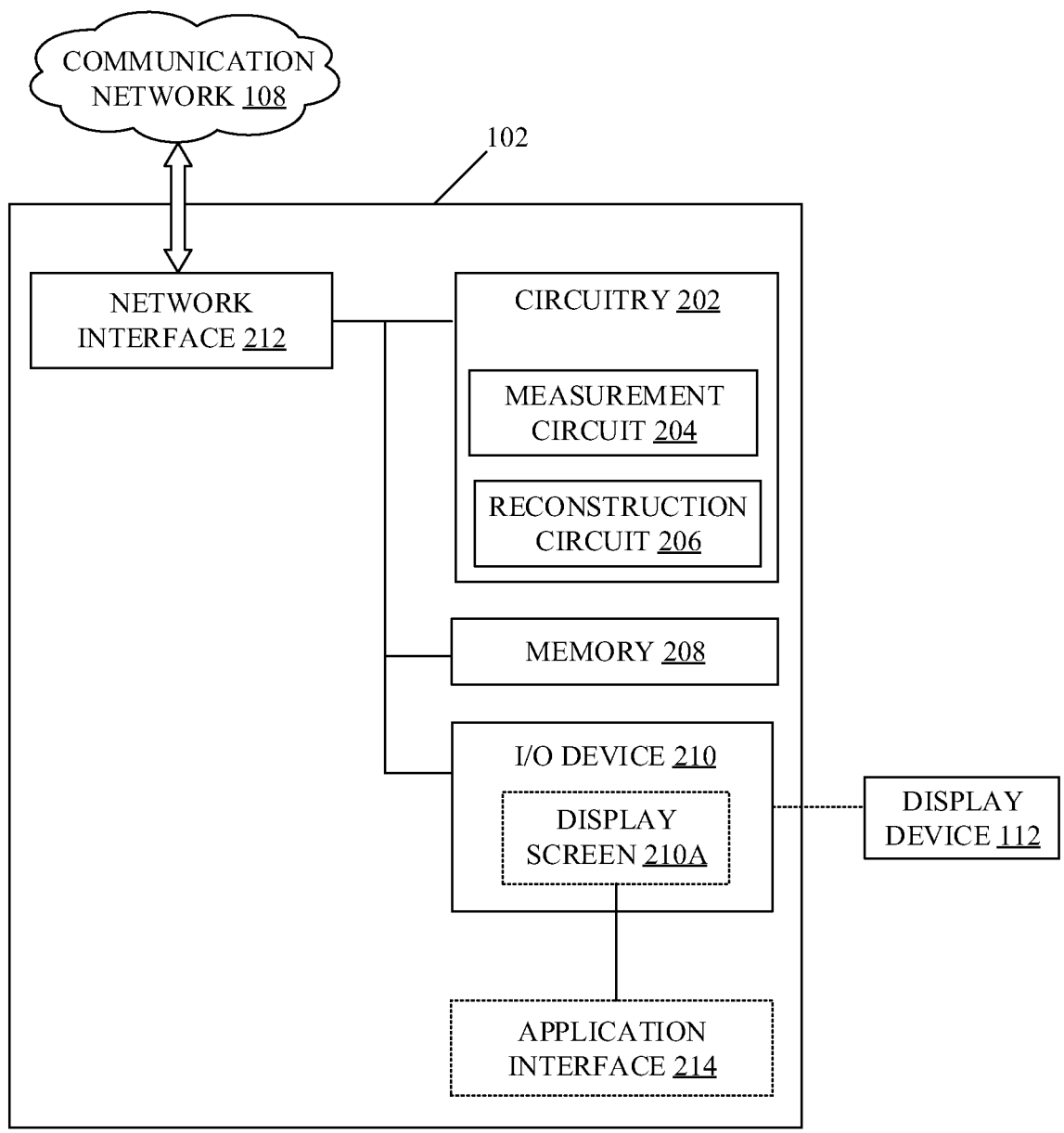
FIG. 2 is a block diagram that illustrates an exemplary apparatus for reconstructing three-dimensional (3D) human body model based on depth points-to-3D human body model surface distance, in accordance with an embodiment of the disclosure.

FIG. 2 is a block diagram that illustrates an exemplary VR-based apparatus, in accordance with an embodiment of the disclosure. FIG. 2 is explained in conjunction with elements from FIG. 1. With reference to FIG. 2, there is shown the VR-based apparatus 102. The VR-based apparatus 102 may include circuitry 202, a measurement circuit 204, a reconstruction circuit 206, a memory 208, an input/output (I/O) device 210, and a network interface 212. The measurement circuit 204 and the reconstruction circuit 206 may be a part of the circuitry 202. The I/O device 210 may include a display screen 210A, which may be utilized to render an application interface 214. The circuitry 202 may be communicatively coupled to the memory 208 and the I/O device 210. The circuitry 202 may be configured to communicate with the server 104 and the sensing device 106, by use of the network interface 212.

The circuitry 202 may comprise suitable logic, circuitry, and/or interfaces that may be configured to reconstruct 3D human body model of the human subject 110 based on the determination of minimum point-to-surface distances between depth data points and the surface of the deformed 3D human body model. The circuitry 202 may comprise one or more specialized processing units, which may be implemented as a separate processor or circuitry in the VR-based apparatus 102. In an embodiment, the one or more specialized processing units and the circuitry 202 may be implemented as an integrated processor or a cluster of processors that perform the functions of the one or more specialized processing units and the circuitry 202, collectively. Examples of implementations of the circuitry 202 may include, but is not limited to a Central Processing Unit (CPU), a Graphics Processing Unit (GPU), a modeling circuitry, a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The measurement circuit 204 may comprise suitable logic, circuitry, and/or interfaces that may be configured to calculate the first distance, the second distance, and the third distance between the plurality of depth data points and the surface of the deformed 3D human body model. The measurement circuit 204 may be further configured to determine the first point of projection of the depth data point on the plane of the triangular face of the plurality of the triangular faces. The measurement circuit 204 may be further configured to determine the second point of projection, of the depth data point, on the edge of the plurality of edges. In accordance with an embodiment, the measurement circuit 204 may be further configured to determine a minimum distance, among the calculated first distance, the calculated second distance, and the calculated third distance, as the point-to-surface distance between the depth data point and the surface of the deformed 3D human body model. In accordance with an embodiment, the measurement circuit 204 may be further configured to determine the plurality of point-to surface distances between each of the depth data points and the surface (which includes the plurality of triangle faces, edges, and vertices) of the deformed 3D human body model Examples of implementations of the measurement circuit 204 may include, but is not limited to a specialized circuitry, a Central Processing Unit (CPU), a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The reconstruction circuit 206 may comprise suitable logic, circuitry, and/or interfaces that may be configured to reconstruct the 3D human body model of the human subject 110 based on the determined point-to-surface distances between the plurality of depth data points and the surface of the deformed 3D human body model. Examples of implementations of the reconstruction circuit 206 may include, but is not limited to a specialized circuitry, a Central Processing Unit (CPU), a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The memory 208 may comprise suitable logic, circuitry, and/or interfaces that may be configured to store a set of instructions executable by the circuitry 202. The memory 208 may be configured to store operating systems and associated applications. In accordance with an embodiment, the memory 208 may be further configured to store the captured plurality of depth data points of the human subject 110 and the captured plurality of images of the human subject 110 from the single viewpoint. The memory device 208 may be configured to store the deformed 3D human body model and a reference 3D human body model. The stored reference 3D human body model may include a mean body shape of humans. In accordance with an embodiment, the memory 208 may be configured to store the determined point-to-surface distances between the plurality of depth data points and the surface of the deformed 3D human body model. The memory device 208 may be further configured to store the reconstructed 3D human body model of the human subject 110. Examples of implementation of the memory device 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, and/or interfaces that may be configured to receive an input from the human subject 110 and provide an output to the human subject 110 based on received input from the human subject 110. For example, the I/O device 210 may be utilized to initialize an operation to reconstruct 3D human body model based on a request from the human subject 110. The I/O device 210 may comprise various input and output devices, which may be configured to communicate with the circuitry 202. Examples of the I/O device 210 may include, but are not limited to, a touch screen, a keyboard, a mouse, a joystick, a microphone, a display screen (for example, the display screen 210A), and a speaker.

The display screen 210A may comprise suitable logic, circuitry, and/or interfaces that may be configured to render the application interface 214 at the display screen 210A, for display of the reconstructed 3D human model of the human subject 110. In accordance with an embodiment, the display screen 210A may be configured to receive input from the human subject 110. In such a scenario, the display screen 210A may be a touch screen, which may enable the human subject 110 to provide input. The touch screen may be at least one of a resistive touch screen, a capacitive touch screen, or a thermal touch screen. In accordance with an embodiment, the display screen 210A may receive the input through a virtual keypad, a stylus, a gesture-based input, or a touch-based input. The display screen 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 210A may refer to a display screen of a smart-glass device, a see-through display, a projection-based display, an electro-chromic display, or a transparent display. In accordance with an embodiment, the display screen 210A may be an external display screen that may be connected to the VR-based apparatus 102.

The network interface 212 may comprise suitable logic, circuitry, and/or interfaces that may be configured to facilitate communication between the VR-based apparatus 102, the server 104, and the sensing device 106, via the communication network 108. The network interface 212 may be implemented by use of various known technologies to support wired or wireless communication of the VR-based apparatus 102 with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN).).

The application interface 214 may correspond to a user interface (UI) rendered on a display screen, such as the display screen 210A, or a display device 216. The application interface 214 may display the reconstructed 3D human body model of the human subject 110. The reconstructed 3D human body model of the human subject 110 may be viewed from a plurality of view-points, by use of the application interface 214. An example of the application interface 214 may include, but is not limited to, a graphical user interface (GUI). The display device 112 may be an external display device. In some embodiments, instead of an integrated display screen 210A, the reconstructed 3D human body model of the human subject 110 may be rendered on the display device 112. Examples of the display device 112 may be similar to that of the display screen 210A.

In operation, the circuitry 202 may be configured to receive the deformed 3D human body model of the human subject 110 from the server 104, via the network interface 212. In some embodiments, the circuitry 202 may be configured to generate the deformed 3D human body model using a reference 3D human body model stored in the memory 208. The deformed 3D human body model may a triangular polygonal mesh model. The deformed three-dimensional (3D) human body model may be generated based on several techniques utilized to generate a 3D human body model. In some embodiments, the VR-based apparatus 102 may be configured to generate the deformed 3D human body model, based on deformation of a mean body shape of a reference 3D human body model in accordance with a plurality of shape parameters and a plurality of pose parameters. To generate the deformed 3D human body model of the first human subject 110, based on the deformation of a mean body shape of a reference 3D human body model, the VR-based apparatus 102 may be configured to initially learn the reference 3D human body model from a training dataset. The training dataset may be a 3D model dataset that may include a plurality of representative human body models of different shapes, for example, the Caesar dataset or other representative human 3D computer graphics model dataset, which includes about 4000 representative human body models of different shapes in a neutral pose. The reference 3D human body model may include a mean body shape and a set of body shape variations. The mean body shape may be a neutral body shape of the reference 3D human body model. The set of body shape variations may include a plurality of human body models in different shapes, for example, a tall human body model, a short human body model, a thin human body model, a fat human body model, and the like. The set of body shape variations may represent deviations from the mean body shape of the reference 3D human body model.

The circuitry 202 may be configured to determine a first shape of the human subject 110 based on the captured plurality of depth values of the human subject 110 from the single viewpoint. The determined first shape of the human subject 110 may be represented as a linear combination of the set of body shape variations. The modeling circuitry 202 may be configured to determine the plurality of shape parameters to deform the mean body shape of the reference 3D human body model to the determined first shape of the human subject 110. The linear coefficients of each body shape variation, for representing the first shape of the human subject 110 as the linear combination of the set of body shape variations, may be the plurality of shape parameters.

In accordance with an embodiment, the circuitry 202 may be configured to store information of a skeleton (e.g. rig) that includes a plurality of joints of the reference 3D human body model. The circuitry 202 may be configured to compute a plurality of rigid transformation matrices for each joint of the plurality of joints of the stored skeleton information. The plurality of rigid transformation matrices for each joint of the plurality of joints may be computed based on a rotation angle with respect to a rotation axis of a joint of the plurality of joints and a location of the joint of the plurality of joints. The plurality of rigid transformation matrices may be a plurality of transformation matrices that may be utilized for rigid transformation of the mean body shape of the reference 3D human body model based on the pose of the human subject 110. The circuitry 202 may determine a plurality of pose parameters for the pose of the human subject 110 based on the computed plurality of rigid transformation matrices. The determination of the plurality of pose parameters may be further based on the rotation angle of each joint of the plurality of joints of the stored skeleton information. The circuitry 202 may be further configured to determine a plurality of blend weights for a plurality of vertices of the mean shape of the reference 3D human body model. Each blend weight of the plurality of blend weights may indicate an extent of deformation that is to be exerted on each vertex of the plurality of vertices of the mean shape of the reference 3D human body model to represent the pose of the human subject 110. Alternatively stated, a blend weight of the plurality of blend weights for a vertex of the mean shape of the reference 3D human body model may indicate an amount of deformation that may be required to be applied on the vertex as a result of one or more joints of the plurality of joints for representation of the pose of the first human subject. The number of joints that affect the deformation of the vertex of the plurality of vertices of the mean shape of the reference 3D human body model may be one or more than one, based on the pose of the human subject 110.

In accordance with an embodiment, the circuitry 202 may be configured to deform the mean body shape of the reference 3D human body model based on the plurality of shape parameters, the plurality of pose parameters, and the computed plurality of blend weights. The circuitry 202 may be configured to generate the deformed 3D human body model for the pose of the human subject 110 based on the deformation of the plurality of vertices of the mean shape of the reference 3D human body model in accordance with the plurality of shape parameters, the plurality of pose parameters and the computed plurality of blend weights. This is how the deformed 3D human body model may be generated based on the deformation of the plurality of vertices of the mean shape of the reference 3D human body model in an example. The circuitry 202 may be configured to store, in the memory 208, the deformed three-dimensional (3D) human body model of the human subject 110, for further processing. The functions or operations executed by the VR-based apparatus 102, as described in FIG. 1, may be performed by the circuitry 202, the measurement circuit 204 and the reconstruction circuit 206. The operations executed by the circuitry 202, the measurement circuit 204 and the reconstruction circuit 206 are further described, for example, in the FIGS. 3A, 3B, 4A, 4B.

Figure 3A:
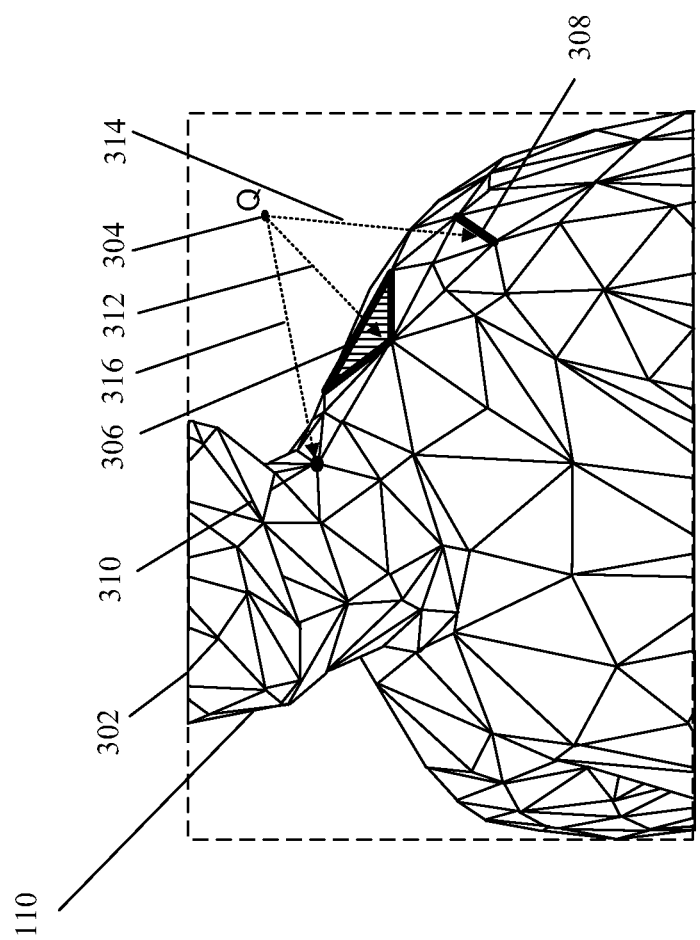
FIGS. 3A and 3B, collectively, illustrate exemplary operations for reconstructing three-dimensional (3D) human body model based on depth points-to-3D human body model surface distance, in accordance with an embodiment of the disclosure.
Figure 3B:
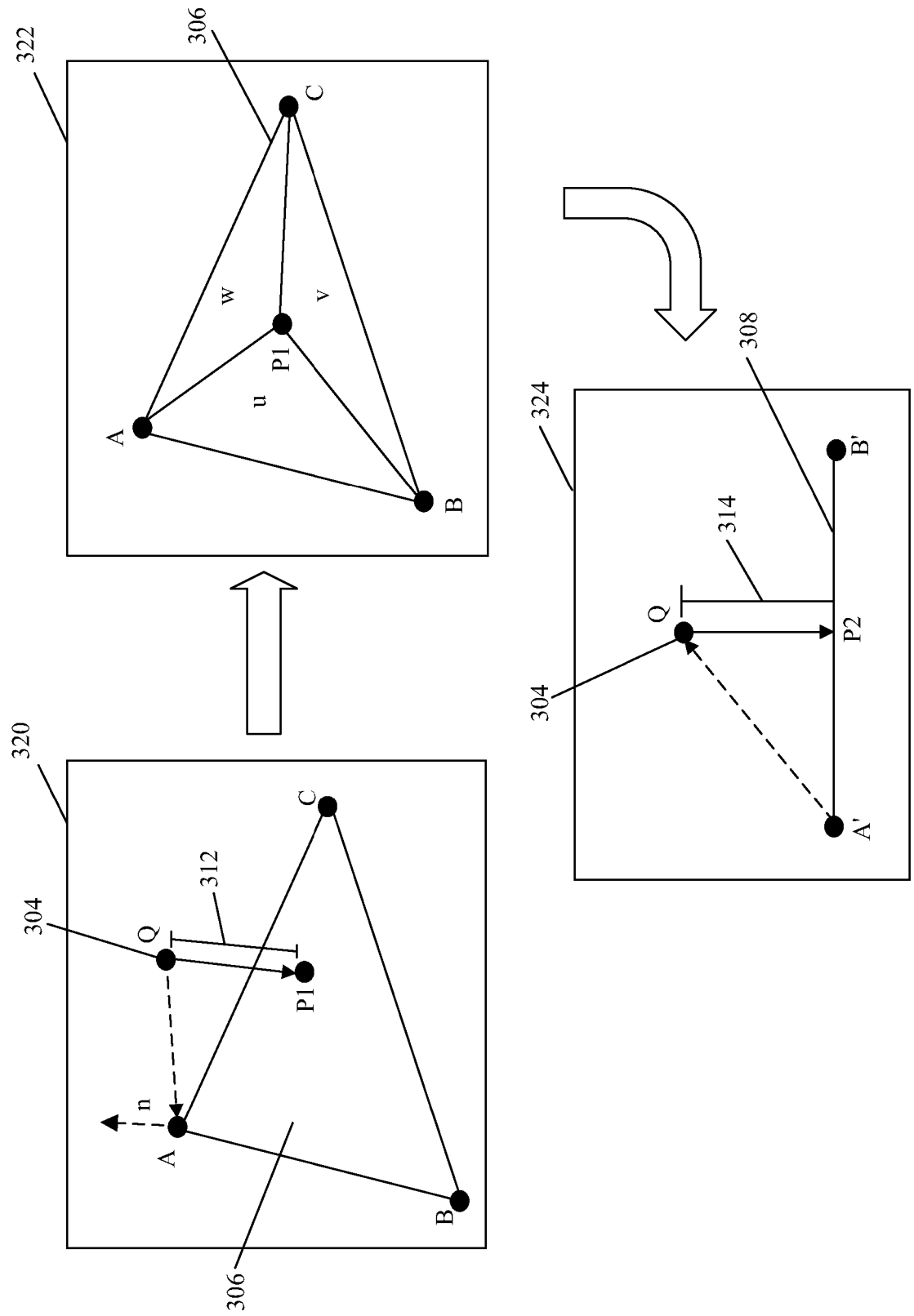

FIGS. 3A and 3B, collectively, illustrate exemplary operations for reconstructing three-dimensional (3D) human body model based on depth points-to-3D human body model surface distance, in accordance with an embodiment of the disclosure. FIGS. 3A and 3B are explained in conjunction with elements from FIGS. 1 and 2. With reference to FIG. 3A, there is shown a deformed 3D human body model 302 of the human subject 110, and a depth data point 304 (also represented by "0") captured from the depth sensor 106B. There is further shown a triangular face 306, an edge 308, and a vertex 310 on a surface of the deformed 3D human body model 302.

In accordance with an embodiment, the complete surface of the deformed 3D human body model 302 may include a plurality of triangular faces (e.g., the triangular face 306), a plurality of edges (e.g., the edge 308), and the plurality of vertices (e.g., the vertex 310). In accordance with an embodiment, the plurality of triangular faces, the plurality of edges, and the plurality of vertices are present on each body part of the deformed 3D human body model of the human subject 110. In accordance with an embodiment, the deformed 3D human body model 302 may be 3D computer graphic (CG) triangular polygonal mesh that includes the triangular face 306, the edge 308 and the vertex 308.

In accordance with an embodiment, the depth sensor 106B may be configured to capture the plurality of depth data points including the depth data point 304 of the human subject 110 from the single viewpoint. The captured depth data point 304 may include a value of "Z" coordinate of the human subject 110 in a 3D coordinate system from the single viewpoint. The human subject 110 may be at rest or in motion at an instance of capture of the plurality of depth data points.

In accordance with an embodiment, the measurement circuit 204 may be configured to calculate the first distance 312, the second distance 314 and the third distance 316 based on the captured depth data point 304 of the human subject 110 from the single viewpoint. In accordance with an embodiment, the first distance 312 may be calculated between the data point 304 and the triangular face 306. In accordance with an embodiment, the second distance 314 may be calculated between the data point 304 and the edge 308. In accordance with an embodiment, the third distance 316 may be calculated between the data point 304 and the vertex 310.

In accordance with an embodiment, the measurement circuit 204 may be configured to calculate a plurality of first distances, a plurality of second distances, and a plurality of third distances from the depth data point 304 to different plurality of triangular faces, the plurality of edges, and the plurality of vertices on the complete surface of the deformed 3D human body model 302 of the human subject 110. In some embodiments, the measurement circuit may be configured to select all the plurality of triangular faces, the plurality of edges, and the plurality of vertices to calculate the point-to-surface distances. In some embodiments, certain triangular faces, edges, and vertices, for example, a set of triangular faces from the complete plurality of triangular faces, a set of edges from the complete plurality of edges, and a set of vertices from the complete plurality of vertices on the surface 302, may be selected. The measurement circuit 204 may be configured to calculate the plurality of first distances, a plurality of second distances, and a plurality of third distances from the depth data point 304 to the selected set of triangular faces, edges, and vertices respectively. In accordance with an embodiment, the measurement circuit 204 may be configured to select the set of triangular faces, edges, and vertices based on predefined settings. In accordance with an embodiment, the measurement circuit 204 may be configured to select only the set of triangular faces, edges, and vertices that are currently affected by a change in pose of the human subject 110 as captured by depth sensor 106B of the sensing device 106.

In accordance with an embodiment, the measurement circuit 204 may be configured to select the set of triangular faces, edges, and vertices which are positioned at same part (i.e. head, shoulder, neck, arm, stomach, leg, feet) of the deformed 3D body 302 of the human subject 110. The calculation of the first distance 312, the second distance 314, and the third distance 316 are described in details, for example, in FIG. 3B.

In accordance with an embodiment, the third distance 316 between the depth data point 304 and the vertex 310 may be considered as a point-to-point distance. In conventional systems, such point-to-point distances from the depth data points to the vertices are calculated to further reconstruct the 3D human body model. In certain scenarios, when the resolution of the sensing device 106 or the resolution of the deformed 3D human body model in a display state reduces below a threshold, the resolution of the vertices on the reconstructed 3D human body model 302 also reduces. With the reduction of the resolution, the plurality of vertices on the surface of the deformed 3D human body model 302 are less and/or not visible clearly. Due to this reduction in the precision of the vertices, the calculated point-to-point distance (as distance metric) between the depth data point and the vertices may not be accurate enough to further reconstruct the 3D human body model accurately. Alternatively stated, reconstruction of a 3D human body model of the human subject 110 may be inaccurate, based on the inaccurate point-to-point distance calculation.

In accordance with an embodiment, the disclosed VR-based apparatus 102 calculates three different types of distances (from one depth data point 304 to the surface 302) which enables to find an accurate minimum distance, as point-to-surface distance, even the resolution of the vertices on the deformed 3D human body model 302 reduces below the threshold. Therefore, an accurate reconstruction of the 3D human body model of the human subject 110 is ensured, despite a drop in resolution of the vertices of the reconstructed 3D human body model 302 at the rendered state.

In accordance with an embodiment, the measurement circuit 204 may be further configured to determine a minimum distance, among the calculated first distance 312, the calculated second distance 314, and the calculated third distance 316, as the point-to-surface distance 318 between the depth data point 304 and the surface of the deformed 3D human body model 302. The calculated first distance 312, the calculated second distance 314 may be considered valid for the determination of the minimum distance based on determination of a first point of projection of the depth data point 304 on a plane of the triangular face 306 and determination of a second point of projection of the depth data point 304 on the edge 308. The determination of the first point of projection and the second point of projection, and the calculation of the first distance 312, the second distance 314, and the third distance 316 are described in details, for example, in FIG. 3B.

With reference to FIG. 3B, there is shown a first representative view 320 to depict calculation of point-to-triangular face distance, i.e., the first distance 312. There is further shown a second representative view 322 to depict the use of barycentric coordinates to ascertain whether the calculated point to triangle face distance, i.e, the first distance 312 is a valid distance or not. There is also shown a third representative view to depict calculation of point to edge distance, i.e., the second distance 314.

The first representative view 320 illustrates the triangular face 306 on the surface of the deformed 3D human body model 302. The triangular face 306 may be represented by three vertices, namely, "A", "B", and "C". The depth data point 304 may also be represented by "Q". The measurement circuit 204 may be configured to determine a direction of a unit normal of the plane defined by the triangle face 306. In accordance with an embodiment, the measurement circuit 204 may be configured to calculate the unit normal of the plane defined by the triangular face 306 to calculate the first distance 312 from the depth data point Q. The unit normal of the triangular face 306 may be calculated, for example, by equation (1) as given below:

$$n = (A-B) \times (A-C) \quad (1)$$

where, n represents the unit normal of the plane of the triangular face 306;
A, B, and C (also shown in FIG. 3B) represent coordinates of the three vertices of the triangular face 306; and
"×" represents cross product of two vectors (A-B) and (A-C).

The measurement circuit 204 may be configured to calculate the first distance 312 (between the depth data point Q and the triangular face 306) based on the determined unit normal of the plane of the triangular face 306, coordinates of the depth data point 304 (also represented by "O"), and coordinate of the vertex A of the triangular face 306. In accordance with an embodiment, the first distance 312 between the depth data point Q and the triangular face 306 may be calculated, for example, by equation (2) as given below:

$$d_1 = (A-Q) * n \quad (2)$$

where, $d_1$ represents the first distance 312 between the depth data point Q and the triangular face 306;
A represents the coordinate of the vertex A of the triangular face 306;

"Q" represents the coordinate of the depth data point 304 (also represented by Q); n represents the unit normal of the plane of the triangular face 306; and
"*" represents dot product of (A-Q) and n.

The measurement circuit 204 may be configured to determine the first point of projection P1 of the depth data point 304 (also represented by Q) on the plane of the triangular face 306, based on the calculated first distance 312 and coordinates of the depth data point 304 (also represented by Q). In accordance with an embodiment, position of the determined first point of projection P1 may be utilized for the validation of the calculated first distance 312, which is then considered to further determine the point-to-surface distance between the depth data point 304 (also represented by Q) and the surface of the deformed 3D human body model 302. In accordance with an embodiment, the calculated first distance 312 may be considered as a valid distance between the depth data point 304 (also represented by Q) and the triangular face 306 when the position of the determined first point of projection P1 of the depth data point 304 may lie inside the plane of the triangular face 306. In accordance with an embodiment, the measurement circuit 204 may be configured to discard (not consider) the calculated first distance 312 for the calculation of the point-to-surface distance when the determined first point of projection P1 lie outside the plane of the triangular face 306.

In accordance with an embodiment, the measurement circuit 204 may be configured to determine whether the first point of projection P1 of the depth data point 304 is inside or outside the plane of the triangular face 306. Such determination of the first point of projection P1 of the depth data point 304 may be based on the barycentric coordinates of the triangular face 306 as depicted in the second representative view 322. In accordance with an embodiment, the barycentric coordinates of the triangular face 306 may be used to represent the position of the first point of projection P1. on the plane of the triangular face 306.

In accordance with an embodiment, the measurement circuit 204 may be configured to utilize the barycentric coordinates to estimate position of the first point of projection P1 located on the plane of the triangle face 306 by using three scalar values. The three scalars values may be represented as u, v, and w. Further, the position of the first point of projection P1, using the barycentric coordinates, may be represented, for example, by equation (3) as given below:

$$P1 = wA + uB + vC \quad (3)$$

where P1 represents the first point of projection of the depth data point Q on the plane of the triangular face 306;
A, B, and C are the coordinates of the vertices of the triangular face 306; and
u, v, w are the three barycentric coordinates to express position of the first point of projection P1 located on the plane of the triangle face 306, such that u+v+w=1

The barycentric coordinates u, v, and w may be normalized such that the summation of u+v+w=1. Equation (3) defines the position of the first point of projection P on the plane of the triangle face 306 formed by the vertices A, B and C. In accordance with an embodiment, the first point of projection P1 of the depth data point Q may lie inside the triangular face 306 when the three scalar values satisfies the equation (5), for example, as given below:

$$0 \leq u, v, w \leq 1 \quad (5)$$

The first point of projection P1 is within the triangular face 306 if 0≤u, and v; and w≤1. If any one of the coordinates from u, v, and w is less than zero or greater than one, the first point of projection P1 is determined to be outside the plane of the triangular face 306. If any of the coordinates from u, v, and w is zero, the first point of projection P1 is on one of the edges joining the vertices of the triangular face 306.

The barycentric coordinates are also known as areal coordinates. In some implementations, the areal coordinates or barycentric coordinates may indicate that the coordinates u, v and w, are proportional to the area of the three sub-triangles defined by the first point of projection P1 located on the triangular face 306 and the three vertices A, B, C of the triangular face 306. The three sub-triangles are denoted by ABP1, BCP1, CAP1 in the second representative view 322 of FIG. 3B.

In accordance with an embodiment, the measurement circuit 204 may be configured to compute the three scalar values for example, in equation (6), equation (7) and equation (8) as given below:

$$v = \frac{\text{Area of Triangle } ABP1}{\text{Area of Triangle } ABC} = \frac{(AB \times AC) * (AB \times AP1)}{(AB \times AC) * (AB \times AC)} \quad (6)$$

$$w = \frac{\text{Area of Triangle } BCP1}{\text{Area of Triangle } ABC} = \frac{(AB \times AC) * (BC \times BP1)}{(AB \times AC) * (AB \times AC)} \quad (7)$$

$$u = \frac{\text{Area of Triangle } ACP1}{\text{Area of Triangle } ABC} = \frac{(AB \times AC) * (AP1 \times AC)}{(AB \times AC) * (AB \times AC)} \quad (8)$$

where $P_1$ represents the first point of projection of the depth data point Q;
A, B, and C are the vertices of the triangular face 306;
u, v, w are the three barycentric coordinates to express position of the first point of projection $P_1$ located on the plane of the triangle face 306;
"*" represents dot product between terms used in equation (6), equation (7) and equation (8); and
"×" represents cross product between the terms used in equation (6), equation (7) and equation (8).

In accordance with an embodiment, the measurement circuit 204 may be configured to convert the cross product used in the equation (6), the equation (7) and the equation (8) to dot product by using Lagrange's identity for efficient computation, which is further represented, for example, in equation (9), equation (10) and equation (11) as given below:

$$(AB \times AC)*(AB \times AC) = \|BA\|^2\|AC\|^2 - (AB*AC)^2 \quad (9)$$

$$(AB \times AC)*(AB \times AP1) = (AB*AB)(AC*AP1) - (AB*AP1)(AB*AC) \quad (10)$$

$$(AB \times AC)*(AP1 \times AC) = (AB*AP1)(AC*AC) - (AB*AC)(AC*AP1) \quad (11)$$

where $P_1$ represents the first point of projection of the depth data point Q;
A, B, and C are the vertices of the triangular face 306;
u, v, w are the three barycentric coordinates to express position of the first point of projection $P_1$ located on the plane of the triangle face 306;
"*" represents dot product between terms used in equation (9), equation (10) and equation (11); and
"×" represents cross product between the terms used in equation (9), equation (10) and equation (11).

In accordance with an embodiment, the measurement circuit 204 may be configured to determine whether the first point of projection P1 of the depth data point 304 (also represented by Q) may lie inside or outside the plane of the triangular face 306, based on the equation (3) to equation (11). Further, based on the determination that the position of the first point of projection P1 is inside the plane of the triangular face 306, the measurement circuit 204 may consider the calculated first distance 312 as valid and further use the calculated first distance 312 for determination of the point-to-surface distance which may be utilized to reconstruct the 3D human body model accurately. In accordance with an embodiment, the measurement circuit 204 may be configured to discard the calculated first distance 312 as the point-to-surface distance based on the determination that the first point of projection P1 of the depth data point Q is outside the plane of the triangular face 306.

In accordance with an embodiment, the measurement circuit 204 may be configured to determine the second point of projection P2 of the depth data point 304 (also represented by Q), on the edge 308 of the plurality of edges, as shown in the third representative view 324. Such determination of the second point of projection P2 may be based on a projection coefficient t (used in equation 12; not shown in FIG. 3B) and coordinates (A' and B'; also shown in FIG. 3B) of the edge 308. In accordance with an embodiment, the measurement circuit 204 may be configured to determine the second point of projection P2 that may be represented by, for example, in equation (12).

$$P_2 = A' + t*(B' - A') \quad (12)$$

where P2 represents the second point of projection of the depth data point Q on the edge 308;
A' and B' represent the coordinates of the end points of the edge 308; and
t represents the projection coefficient to determine the second point of projection P2 on the edge 308.

In accordance with an embodiment, the measurement circuit 204 may be further configured to determine a value of the projection coefficient t for the determination of the second point of projection P2. The determination of the projection coefficient t may be represented by, for example, by equation (13) as given below:

$$t = (A'Q*A'B')/(A'B'*A'B') \quad (13)$$

where t represents the projection coefficient for the second point of projection P2 on the edge 308;
A' and B' represent the coordinates of the end points of the edge A308; and
Q represents the depth data point 304.

In accordance with an embodiment, the measurement circuit 204 may be further configured to determine the second point of projection P2 of the depth data point 304 (also represented by Q) on the edge 308 based on the determined projection coefficient t and coordinates (A' and B') of the edge 308 (from equation 13). The measurement circuit 204 may be further configured to calculate the second distance 314 from the depth data point 304 (also represented by Q) to the edge 308. The calculation of the second distance 314 from the depth data point 304 (also represented by Q) to the edge 308 may be represented, for example, by equation (14) as given below:

$$d_2 = \|P2Q\| \quad (14)$$

where $d_2$ represents the second distance 314 from the depth data point Q to the edge 308;
P2 represents the second point of projection of the depth data point Q on the edge 308; and
Q represents the depth data point 304.

In accordance with an embodiment, the measurement circuit 204 may be further configured to determine whether the second point of projection P2 of the depth data point 304

(also represented by Q) may lie between end points (A' and B') of the edge 308 based on the value of the projection coefficient t. In accordance with an embodiment, the second point of projection P2 of the depth data point Q may lie in-between end points (A' and B') of the edge 308 when the value of the determined projection coefficient lies between 0 and 1 (represented by $0 \leq t \leq 1$). In accordance with an embodiment, the calculated second distance 314 may be considered (as valid) for the determination of the point-to-surface distance between the depth data point Q and the surface of the deformed 3D human body model 302 based on the value of the determined projection coefficient that lies between 0 and 1.

In accordance with an embodiment, the measurement circuit 204 may be further configured to calculate a third distance 316 from the depth data point 304 to the vertex 310 of the plurality of vertices in the deformed 3D human body model 302 as shown in FIG. 3A. In accordance with an embodiment, the measurement circuit 204 may be configured to determine a minimum distance, among the calculated first distance 312, the calculated second distance 314, and the calculated third distance 316, between the depth data point 304 and the surface of the deformed 3D human body model 302. In accordance with an embodiment, the calculated first distance 312 and the second distance 312 are considered to determine the minimum distance based on the determined first point of projection P1 and the determined second point of projection P2 respectively. The determined minimum distance may correspond to a point-to-surface distance between the depth data point 304 and the surface of the deformed 3D human body model 302 of the human subject 110. Similarly, the measurement circuit 204 may be further configured to determine the plurality of the point-to-surface distances between the plurality of depth data points, and the plurality of triangular faces, the plurality of edges and the plurality of vertices of the deformed 3D human body model 302.

In accordance with an embodiment, the determined plurality of the point-to-surface distances may be utilized to refine the deformed 3D human body model 302 of the human subject 110 with higher accuracy in comparison to the utilization of point-to-point distance for reconstruction of the 3D human body model of the convention systems. Therefore, calculation of the point to surface distance (as the minimum distance) provides better refinement of the deformed 3D human body model 302.

In accordance with an embodiment, the reconstruction unit 206 may be configured to reconstruct the 3D human body model of the human subject 110 based on the determined point-to-surface distance between the depth data point 304 and the surface of the deformed 3D human body model 302. In accordance with an embodiment, the reconstruction unit 206 may be configured to reconstruct the 3D human body model of the human subject 110 based on the determined plurality of the point-to-surface distances. In accordance with an embodiment, the reconstruction unit 206 may be configured to control display of the reconstructed 3D human body model of the human subject 110 on the display device 112 such that the plurality of point-to-surface distances are minimized at a display state of the reconstructed 3D model on the display device 112. The reconstruction of the 3D human body model using the determined plurality of the point-to-surface distances is accurate even when the resolution of the vertices reduces below the defined threshold during the rendering state of the reconstructed 3D human body model on the display device 112. The reconstructed 3D human body model exhibits and mimics deformation (i.e., current shape, size, and pose) that is same or near same as the captured deformation (i.e., a change in a pose of the human subject 110 indicated by depth data points) by the single depth sensor, such as the depth sensor 106B.

Figure 4A:
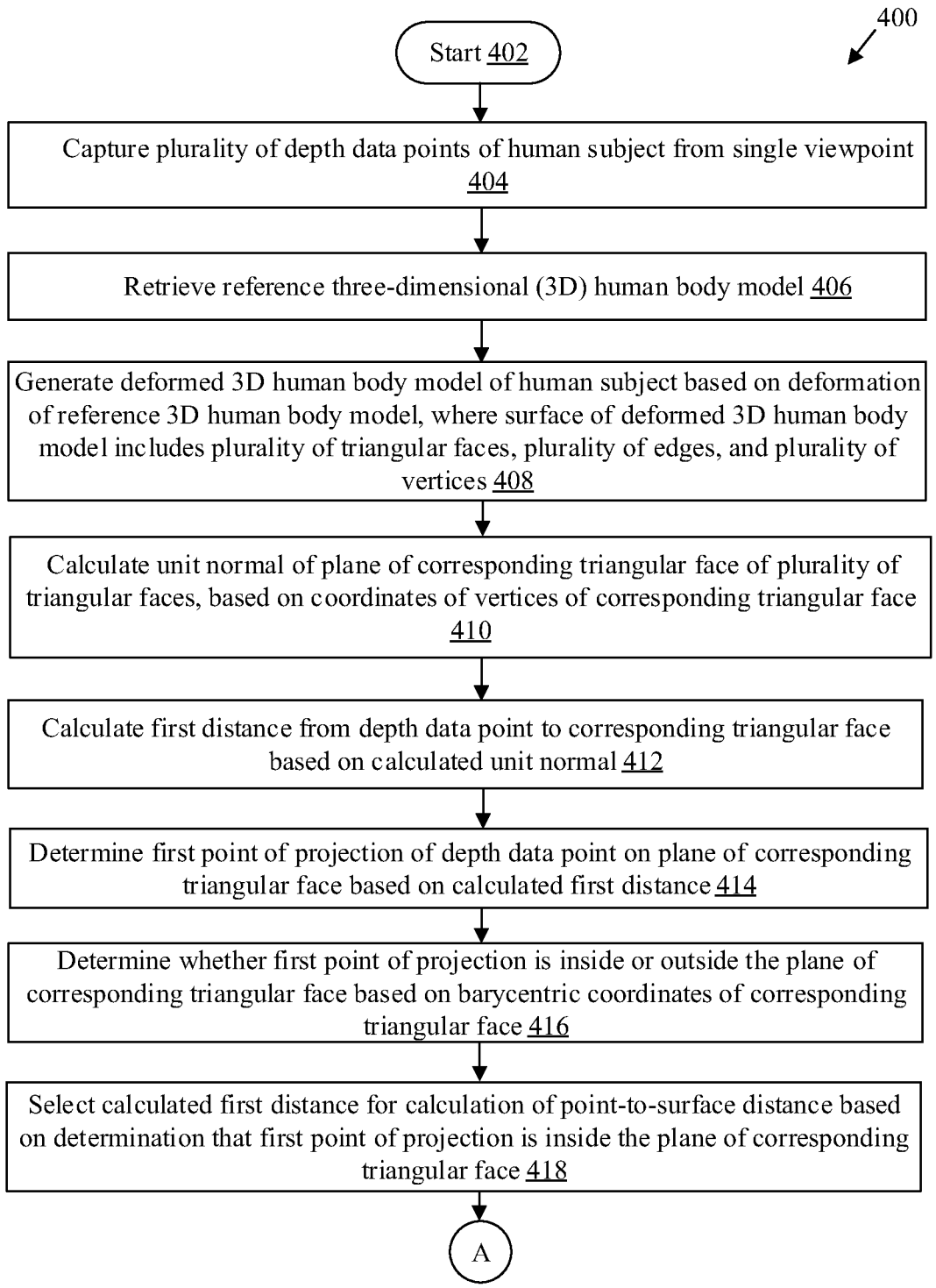
FIGS. 4A, 4B, and 4C, collectively, depict a flowchart that illustrates exemplary operations for reconstructing three-dimensional (3D) human body model based on depth points-to-3D human body model surface distance, in accordance with an embodiment of the disclosure.
Figure 4B:
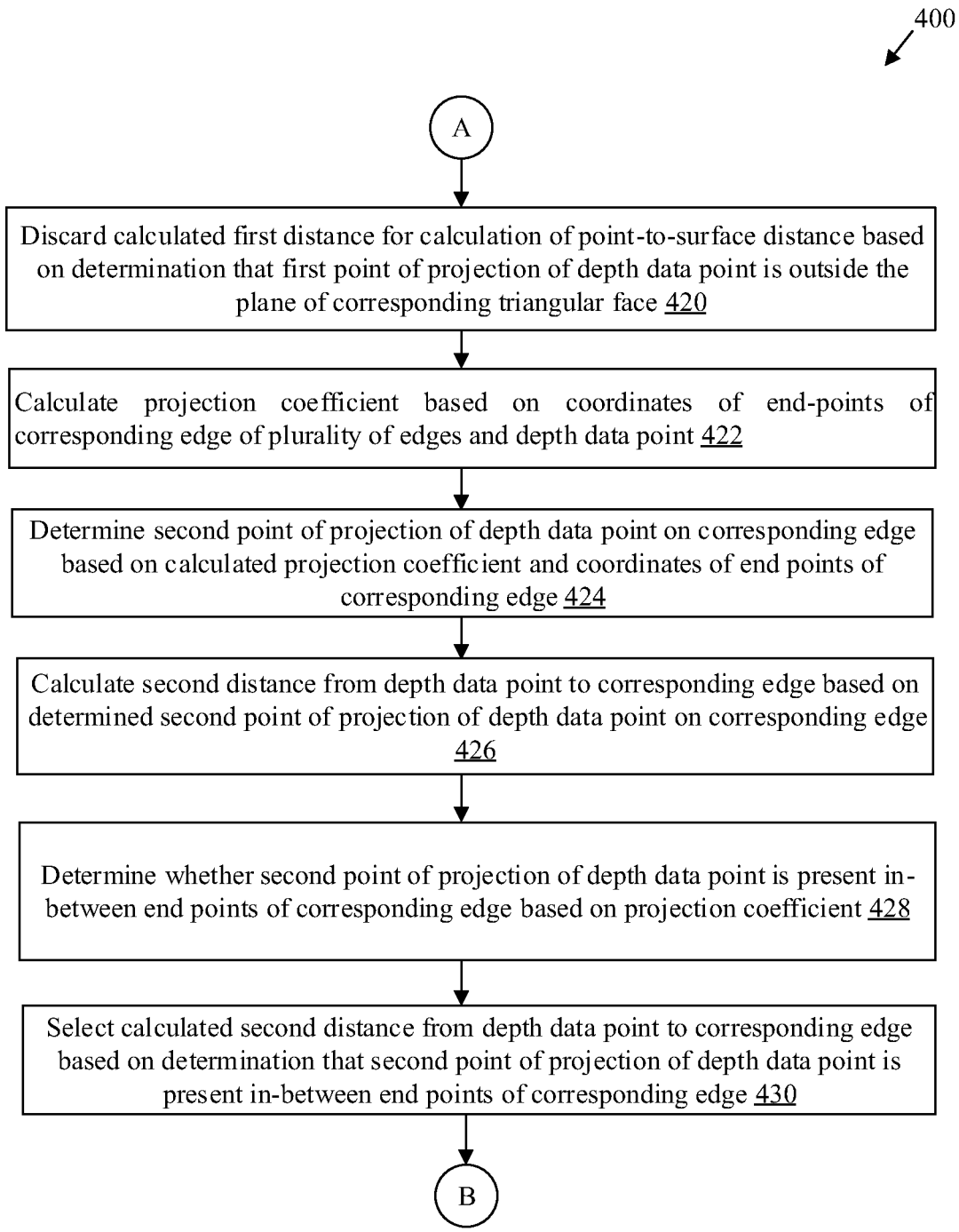
Figure 4C:
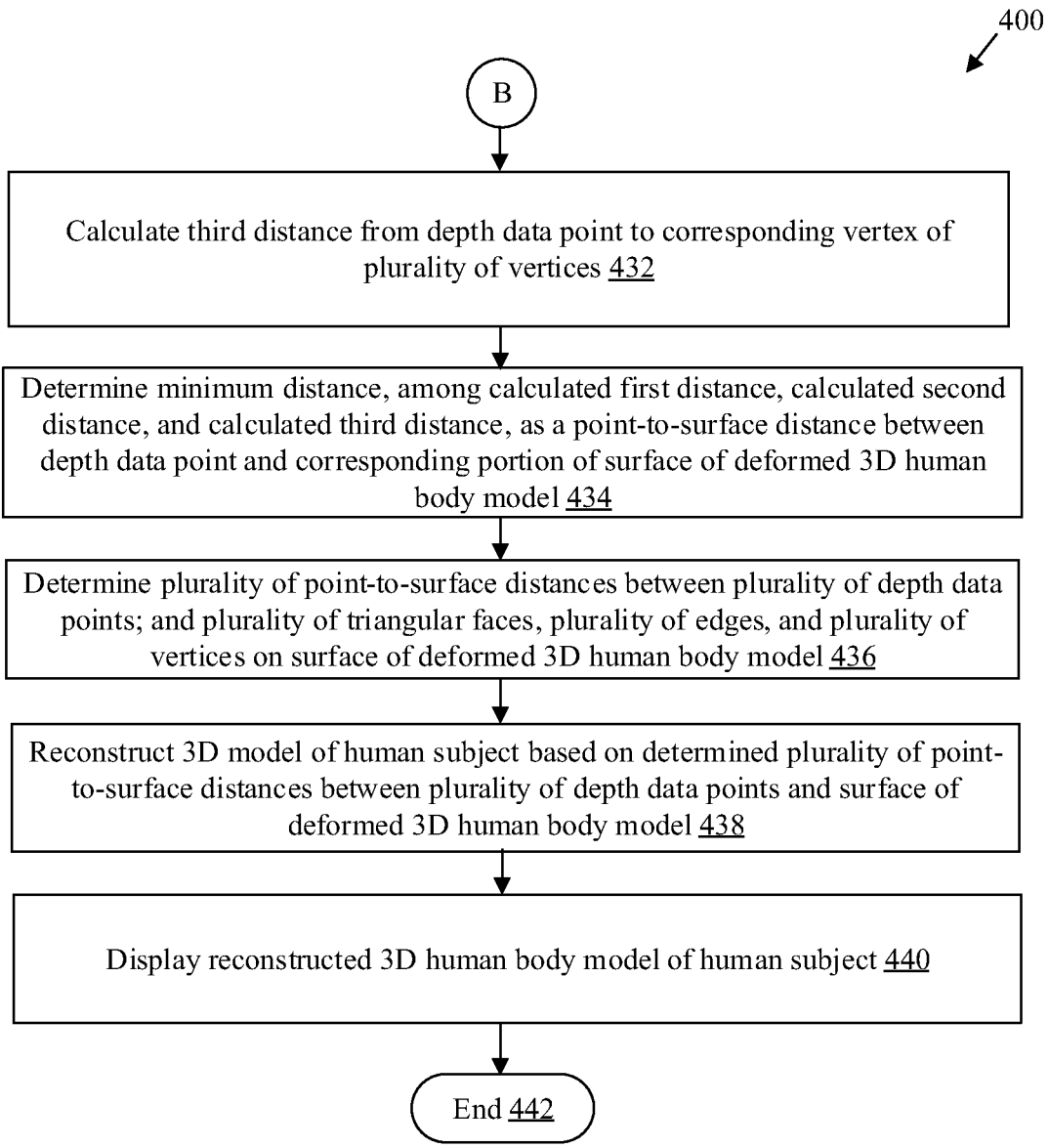

FIGS. 4A and 4B are flowcharts that collectively illustrate exemplary operations for reconstructing three-dimensional (3D) human body model based on depth points-to-3D human body model surface distance, in accordance with an embodiment of the disclosure. With reference to FIGS. 4A and 4B, there is shown a flowchart 400. The flowchart 400 is described in conjunction with FIGS. 1, 2, 3A and 3B. The operations from 404 to 440 may be implemented in the VR-based apparatus 102. The operations of the flowchart 400 may start at 402 and proceed to 404.

At 404, a plurality of depth data points and a plurality of images of the first human subject 110 may be captured from a single viewpoint. The sensing device 106 may comprise the depth sensor 106B which is configured to capture the plurality of depth data points of the human subject 110 from the single viewpoint. The captured plurality of depth values may include values of "Z" coordinates of the human subject 110 in a 3D coordinate system from the single viewpoint.

At 406, a reference 3D human body model is retrieved from the memory 208 of the VR-based apparatus 102. The circuitry 202 of the VR-based apparatus 102 may be configured to retrieve the reference 3D human body model from the memory 208. In accordance with an embodiment, the circuitry 202 may be configured to retrieve the reference 3D human body model from the server 104 via the communication network 108. The reference 3D human body model may include the mean body shape.

At 408, a deformed three-dimensional (3D) human body model of the human subject 110 that is to be modeled may be generated. The circuitry 202 may be configured to generate the deformed 3D human body model 302 based on the deformation of the reference 3D human body model. The memory 208 may be configured to store the deformed three-dimensional (3D) human body model of the human subject 110. A surface of the deformed 3D human body model may include the plurality of triangular faces, the plurality of edges and the plurality of vertices. In accordance with an embodiment, the VR-based apparatus 102 may be configured to receive the deformed 3D human body model of a human subject that has to be modeled from the server 104 via the communication network 108.

At 410, a unit normal of a plane of a corresponding triangular face (of the plurality of triangular faces) on the surface of the deformed 3D human body model may be calculated. In accordance with an embodiment, the measurement circuit 204 may be configured to calculate the unit normal of the plane of the corresponding triangle based on the coordinates of vertices of the corresponding triangle.

At 412, a first distance 312 from a depth data point 304 (of the plurality of the depth data points) to the corresponding triangular face 306 may be calculated. In accordance with an embodiment, the measurement circuit 204 may be configured to calculate the first distance 312 from the depth data point 304 to the triangular face 306 based on the calculated unit normal of the plane of the triangular face, the depth data point 304, and the coordinates of vertices of the triangular face 306.

At 414, a first point of projection P1 of the depth data point 304 may be determined on a plane of the triangular face 306 based on the calculated first distance 312. The measurement circuit 204 may be further configured to determine the first point of projection P1 of the depth data point 304 on the plane of the corresponding triangular face

306 based on the calculated first distance 312. The determination of the first point of projection P1 is shown and described, for example, in FIG. 3B.

At 416, the first point of projection P1 of the depth data point 304 may be determined to be inside or outside the plane of the triangular face 306. In accordance with an embodiment, the measurement circuit 204 may be configured to determine whether the first point of projection P1 of the depth data point 304 is inside or outside the plane of the triangular face based on the barycentric coordinates of the triangular face 306. The determination of barycentric coordinates is shown and described, for example, in FIG. 3B.

At 418, the calculated first distance 312 from the depth data point 304 to the corresponding triangular face 306 may be selected (i.e., considered as valid) for the calculation of the point-to-surface distance based on the determination that the first point of projection P1 of the depth data point 304 is inside the plane of the triangular face 306. In accordance with an embodiment, the measurement circuit 204 may be further configured to select the calculated first distance 312 (as valid) to determine the point-to-surface distance based on the determination.

At 420, the calculated first distance 312 from the depth data point 304 to the corresponding triangular face 306 is discarded for the calculation of the point-to-surface distance based on the determination that the first point of projection P1 of the depth data point 304 is outside the plane of the triangular face 306. In accordance with an embodiment, the measurement circuit 204 may be further configured to discard the calculated first distance 312 for the calculation of the point-to-surface distance based on the determination that the first point of projection P1 is outside the plane of the triangular face 306.

At 422, a projection coefficient may be calculated based on coordinates of the end-points of the edge 308 (of the plurality of edges) and the depth data point 304. In accordance with an embodiment, the measurement circuit 204 may be further configured to determine a value of the projection coefficient based on coordinates of the end-points of the edge 308 (of the plurality of edges) and the depth data point 304. The projection coefficient is for the determination of a second point of projection P2 of the depth data point 304 on the edge 308 of the deformed 3D human body model 302.

At 424, a second point of projection P2 of the depth data point 304 may be determined on the corresponding edge 308 of the plurality of edges. In accordance with an embodiment, the measurement circuit 204 may be configured to determine the second point of projection P2 of the depth data point 304 on the edge 308. Such determination of the second point of projection P2 may be based on the calculated projection coefficient and coordinates of the edge. The determination of the second point of projection P2 is shown and described, for example, in FIG. 3B.

At 426, the second distance 314 from the depth data point 304 to the edge 308 may be calculated. In accordance with an embodiment, the measurement circuit 204 may be configured to calculate the second distance 314 from the depth data point 304 to the edge 308 based on the determined second point of projection P2.

At 428, the second point of projection P2 of the depth data point 304 may be determined to be present in-between end points of the edge 308 or not based on the projection coefficient. In accordance with an embodiment, the measurement circuit 204 may be configured to determine whether the second point of projection P2 of the depth data point 304 is in-between end points of the edge 308 based on the projection coefficient. The determination of the second point of projection is shown and described, for example, in FIG. 3B. The second point of projection P2 of the depth data point Q may lie in-between end points of the edge 308 when the value of the determined projection coefficient lies between 0 and 1.

At 430, the second distance 314 from the depth data point 304 to the edge 308 may be selected (i.e., considered as valid) for the calculation of the point-to-surface distance based on the determination that the second point of projection is present in-between end points of the edge 308. In accordance with an embodiment, the measurement circuit 204 may be configured to select and consider the calculated second distance 314 for the calculation of the point-to-surface distance based on the determination.

At 432, a third distance 316 may be calculated from the depth data point 304 to corresponding vertex 310 of the plurality of vertices. In accordance with an embodiment, the measurement circuit 204 may be further configured to calculate the third distance 316 from the depth data point 304 to the vertex 310 of the deformed 3D human body model 302.

At 434, a minimum distance may be determined, among the calculated first distance 312, the calculated second distance 314, and the calculated third distance 316, as a point-to-surface distance between the depth data point 304 and the surface of the deformed 3D human body model 302. In accordance with an embodiment, the measurement circuit 204 may be configured to determine the minimum distance, among the calculated first distance 312, the calculated second distance 314, and the calculated third distance 316 between the depth data point 304 and the surface of the deformed 3D human body model. Such determination of the minimum distance may be based on the determined first point of projection and the determined second point of projection. The calculated the first distance 312 may be considered for the determination of the point-to-surface distance when the position of the determined first point of projection P1 may be inside the triangular face 306. The calculated second distance P2 may be considered for the determination of the point-to-surface distance when the position of the determined second point of projection P2 may lie in between the end-points of the edge 308.

At 436, a plurality of the point-to-surface distances may be determined between the plurality of depth data points, and the plurality of triangular faces, the plurality of edges and the plurality of vertices of the deformed 3D human body model 302. In accordance with an embodiment, the measurement circuit 204 may be configured to determine the plurality of the point-to-surface distances between the plurality of depth data points, and the plurality of triangular faces, the plurality of edges and the plurality of vertices of the deformed 3D human body model 302.

At 438, a 3D human body model of the human subject may be reconstructed based on the determined point-to-surface distances between the depth data points and the surface of the deformed 3D human body model 302. In accordance with an embodiment, the reconstruction unit 206 may be configured to reconstruct the 3D human body model of the human subject 110 based on the determined point-to-surface distances between the depth data points and the surface of the deformed 3D human body model At 440, a display device may be controlled to display the reconstructed 3D human body model of the human subject 110 such that the plurality of point-to-surface distances are minimized at a display state of the reconstructed 3D model of the human subject on the display device 112. The reconstructed 3D human body model may be more accurate even when the resolution of the vertices of the deformed human body model 302 decreases below the particular threshold during the display state of the deformed 3D human body model on the display device 112.

Exemplary aspects of the disclosure may include a VR-based apparatus (such as the VR-based apparatus 102) that includes a memory (such as the memory 208) configured to store a deformed three-dimensional (3D) human body model of a human subject that has to be modeled and a plurality of depth data points, of the human subject, captured from a single viewpoint. In accordance with an embodiment, a surface of the deformed 3D human body model may comprise, a plurality of triangular faces, a plurality of edges and a plurality of vertices. The VR-based apparatus may be communicatively coupled to a sensing device (such as the sensing device 106) that may include a depth sensor (such as the depth sensor 106B) configured to capture the plurality of depth data points of the human subject. The VR-based apparatus may further include circuitry (such as the circuitry 202) configured to calculate a first distance from a depth data point, of the plurality of the depth data points, to a triangular face of the plurality of triangular faces. The circuitry may be further configured to determine a first point of projection of the depth data point on a plane of the triangular face. Such determination of the first point of projection may be based on the calculated first distance. The circuitry may be further configured to determine a second point of projection, of the depth data point, on an edge of the plurality of edges. Such determination of the second point of projection may be based on a projection coefficient and coordinates of the edge. The circuitry may be further configured to calculate a second distance from the depth data point to the edge. The calculation of the second distance may be based on the determined second point of projection. The circuitry may be configured to calculate a third distance from the depth data point to a vertex of the plurality of vertices. The circuitry may be configured to determine a minimum distance, among the calculated first distance, the calculated second distance, and the calculated third distance, as a point-to-surface distance between the depth data point and the surface of the deformed 3D human body model. The determination of the minimum distance as a point-to-surface distance may be based on the determined first point of projection and the determined second point of projection. In accordance with an embodiment, the circuitry may be further configured to determine a plurality of the point-to-surface distances between the plurality of depth data points, and the plurality of triangular faces, the plurality of edges and the plurality of vertices of the deformed 3D human body model. In accordance with an embodiment, the circuitry may be further configured to reconstruct the 3D human body model based on the determined plurality of the point-to-surface distances.

In accordance with an embodiment, the VR based apparatus may comprise a depth sensor configured to capture the plurality of depth data points of the human subject from the single viewpoint. In accordance with an embodiment, the memory is further configured to store a reference 3D human body model which comprises a mean body shape. In accordance with an embodiment, the circuitry may be further configured to generate the deformed 3D human body model of the human subject based on the reference 3D human body model and the captured plurality of depth data points.

In accordance with an embodiment, the circuitry may be further configured to calculate the first distance from the depth data point to the plane of the triangular face, based on a unit normal of the plane of the triangular face, the depth data point, and coordinates of vertices of the triangular face.

In accordance with an embodiment, the circuitry may be further configured to determine whether the first point of projection of the depth data point is inside or outside the plane of the triangular face, based on barycentric coordinates of the triangular face. In accordance with an embodiment, the circuitry may be further configured to discard the calculated first distance to determine the point-to-surface distance based on the determination that the first point of projection of the depth data point is outside the plane of the triangular face. In accordance with an embodiment, the circuitry may be further configured to consider the calculated first distance to determine the point-to-surface distance based on the determination that the first point of projection of the depth data point is inside the plane of the triangular face.

In accordance with an embodiment, the circuitry may be further configured to determine whether the second point of projection of the depth data point is in-between end points of the edge, based on the projection coefficient. In accordance with an embodiment, the circuitry may be further configured to consider the second distance for the calculation of the point-to-surface distance based on the determination that the second point of projection of the depth data point is present in-between the end points of the edge. In accordance with an embodiment, the circuitry may be further configured to calculate the projection coefficient based on coordinates of the end-points of the edge and the depth data point. In accordance with an embodiment, the circuitry may be further configured to control a display device to display the reconstructed 3D model of the human subject such that the plurality of point-to-surface distances between the plurality of depth data points and the surface of the deformed 3D human body model is minimized at a rendered state of the reconstructed 3D model of the human subject on the display device. Further, the plurality of point-to-surface distances between the plurality of depth data points and the surface of the deformed 3D human body model is minimized despite a reduction in a resolution of the plurality of vertices on the deformed 3D human body model, below a threshold at the rendered state of the reconstructed 3D human body model on the display device.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to a sensing device. The set of instructions may be executable by the machine and/or the computer to perform the steps that comprise the storage of a deformed three dimensional (3D) human body model of a human body. A plurality of depth data points of a human subject that has to be modeled may be captured from a single viewpoint. A surface of the deformed 3D human body model may comprise a plurality of triangular faces, a plurality of edges and a plurality of vertices. A first distance may be calculated from a depth data point, of the plurality of the depth data points, to a triangular face of the plurality of triangular faces. A first point of projection of the depth data point may be determined on a plane of the triangular face. The determination of the first point of projection may be based on the calculated first distance. A second point of projection, of the depth data point, may be determined on an edge of the plurality of edges. The second point of projection may be based on a projection coefficient and coordinates of the edge. A second distance from the depth data point to the edge may be calculated. The calculation of the second distance may be based on the determined second point of projection. A third distance may be calculated from the depth data point to a vertex of the plurality of vertices. A minimum distance, among the calculated first distance, the calculated second distance, and the calculated third distance, may be determined as a point-to-surface distance between the depth data point and the surface of the deformed 3D human body model. The determination of the minimum distance as the point-to-surface distance may be based on the determined first point of projection and the determined second point of projection. Further, a plurality of point-to-surface distances between the plurality of depth data points, and the plurality of triangular faces, the plurality of edges, and the plurality of vertices on the surface of the deformed 3D human body model may be determined. A 3D human body model of the human subject may be further reconstructed based on the determined point-to-surface distances between the plurality of depth data points and the surface of the deformed 3D human body model.

In accordance with an exemplary aspect of the disclosure, the VR-based apparatus 102 may be an augmented-reality based device. Thus, the operations executed by the VR-based apparatus 102 as described in the present disclosure, may also be executed by the augmented-reality based device. For example, the virtual-reality based device may present a human body model, such as the reconstructed 3D human body model, of a human, such as the human subject 110 to a second human. The reconstructed 3D human body model of the human subject 110 may mimic the body of the first human subject in a plurality of poses in real time or near-real time. The reconstructed 3D human body model of the human subject 110 may also be textured with image data to resemble the human subject 110. Thus, the display of the reconstructed 3D human body model by the virtual reality based device creates a virtual presence of the human, such as the human subject, in a remote location, for the second human.

In accordance with another exemplary aspect of the disclosure, the VR-based apparatus 102 may be a gaming device. Thus, the operations executed by the VR-based apparatus 102 as described in the present disclosure, may also be executed by the gaming device. For example, the gaming device may present a gaming character, such as the reconstructed 3D human body model of the human subject 110, in a gaming environment to a player. The gaming device may further cause the gaming character to imitate one or more poses of the player. This may enable the player to control movement of the gaming character in the gaming environment. For example, in the event the player starts to move his head, the gaming character may imitate the moving head of the player. The gaming environment may also be a multiplayer game. In such a case, the gaming device may present a plurality of gaming characters, each imitating one of the multiple players in the multiplayer game.

In accordance with yet another exemplary aspect of the disclosure, the VR-based apparatus 102 may be a 3D model-based conferencing system. Thus, the operations executed by the VR-based apparatus 102 as described in the present disclosure, may also be executed by the 3D model-based conferencing system. Usually, the conventional video conferencing systems require a high network bandwidth for a seamless transmission of video. In an event that the requirement of network bandwidth is not fulfilled, video conferencing is hindered. The 3D model based conferencing device, such as the VR-based apparatus 102, enables video less conferencing that may not require a high network bandwidth for video transmission. The 3D model based conferencing device may then animate the reconstructed 3D human model of the human subject 110. The animated 3D model may be presented along with recorded audio of the first person to a second person involved in the conferencing. The 3D model based conferencing device enables the first person and the second person to participate in conferencing.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A Virtual Reality (VR) based apparatus, comprising:
   a memory configured to store a deformed three-dimensional (3D) human body model of a human subject that is to be modeled and a plurality of depth data points, of the human subject, captured from a single viewpoint, wherein a surface of the deformed 3D human body model comprises a plurality of triangular faces, a plurality of edges, and a plurality of vertices; and
   circuitry configured to:
   for each of the plurality of depth data points:
   calculate a first distance from a depth data point, of the plurality of depth data points, to a corresponding triangular face of the plurality of triangular faces;
   determine a first point of projection of the depth data point on a plane of the corresponding triangular face based on the calculated first distance;
   determine a second point of projection of the depth data point on a corresponding edge of the plurality of edges based on a projection coefficient and coordinates of end points of the corresponding edge, wherein the end points correspond to two vertices of the plurality of vertices;

calculate a second distance from the depth data point to the corresponding edge based on the determined second point of projection;

calculate a third distance from the depth data point to a corresponding vertex of the plurality of vertices; and determine a minimum distance, among the calculated first distance, the calculated second distance, and the calculated third distance, as a point-to-surface distance between the depth data point and a corresponding portion of the surface of the deformed 3D human body model based on the determined first point of projection and the determined second point of projection;

determine a plurality of point-to-surface distances between the plurality of depth data points, and the plurality of triangular faces, the plurality of edges, and the plurality of vertices on the surface of the deformed 3D human body model; and reconstruct a 3D model of the human subject based on the determined plurality of point-to-surface distances between the plurality of depth data points and the surface of the deformed 3D human body model.

2. The VR based apparatus according to claim 1, further comprising a depth sensor configured to capture the plurality of depth data points of the human subject from the single viewpoint.

3. The VR based apparatus according to claim 1, wherein the memory is further configured to store a reference 3D human body model which comprises a mean body shape, wherein the deformed 3D human body model is generated based on deformation of the reference 3D human body model.

4. The VR based apparatus according to claim 1, wherein the circuitry is further configured to, for each of the plurality of depth data points, calculate the first distance from the depth data point to the plane of the corresponding triangular face, based on a unit normal of the plane of the corresponding triangular face, the depth data point, and coordinates of vertices of the corresponding triangular face.

5. The VR based apparatus according to claim 1, wherein the circuitry is further configured to, for each of the plurality of depth data points, determine whether the first point of projection of the depth data point is inside or outside the plane of the corresponding triangular face, based on barycentric coordinates of the corresponding triangular face.

6. The VR based apparatus according to claim 1, wherein the circuitry is further configured to:

for each of the plurality of depth data points:
determine whether the second point of projection of the depth data point is present in-between the end points of the corresponding edge based on the projection coefficient; and determine the point-to-surface distance based on the determination that the second point of projection of the depth data point is present in-between the end points of the corresponding edge.

7. The VR based apparatus according to claim 1, wherein the circuitry is further configured to, for each of the plurality of depth data points, calculate the projection coefficient based on the coordinates of the end points of the corresponding edge and the depth data point.

8. The VR-based apparatus according to claim 1, wherein the circuitry is further configured to control a display device to display the reconstructed 3D model of the human subject such that the plurality of point-to-surface distances between the plurality of depth data points and the surface of the deformed 3D human body model is minimized at a rendered state of the reconstructed 3D model of the human subject on the display device.

9. The VR-based apparatus according to claim 8, wherein the plurality of point-to-surface distances between the plurality of depth data points and the surface of the deformed 3D human body model is minimized despite a reduction in a resolution of the plurality of vertices on the deformed 3D human body model, below a threshold at the rendered state of the reconstructed 3D human body model on the display device.

10. A method, comprising:

in a virtual reality (VR) based apparatus that includes a memory and circuitry:

storing, in the memory, a deformed three-dimensional (3D) human body model of a human subject that is to be modeled and a plurality of depth data points, of the human subject, captured from a single viewpoint, wherein a surface of the deformed 3D human body model comprises, a plurality of triangular faces, a plurality of edges and a plurality of vertices;

for each of the plurality of depth data points:
calculating, by the circuitry, a first distance from a depth data point, of the plurality of depth data points, to a corresponding triangular face of the plurality of triangular faces;

determining, by the circuitry, a first point of projection of the depth data point on a plane of the corresponding triangular face based on the calculated first distance;

determining, by the circuitry, a second point of projection of the depth data point on a corresponding edge of the plurality of edges based on a projection coefficient and coordinates of end points of the corresponding edge, wherein the end points correspond to two vertices included in the plurality of vertices;

calculating, by the circuitry, a second distance from the depth data point to the corresponding edge based on the determined second point of projection;

calculating, by the circuitry, a third distance from the depth data point to a corresponding vertex of the plurality of vertices; and determining, by the circuitry, a minimum distance, among the calculated first distance, the calculated second distance, and the calculated third distance, as a point-to-surface distance between the depth data point and a corresponding portion of the surface of the deformed 3D human body model based on the determined first point of projection and the determined second point of projection;

determining a plurality of point-to-surface distances between the plurality of depth data points, and the plurality of triangular faces, the plurality of edges, and the plurality of vertices on the surface of the deformed 3D human body model; and reconstructing, by the circuitry, a 3D model of the human subject based on the determined plurality of point-to-surface distances between the depth data points and the surface of the deformed 3D human body model.

11. The method according to claim 10, further comprising capturing, by a depth sensor of the VR based apparatus, the plurality of depth data points of the human subject from the single viewpoint.

12. The method according to claim 10, further comprising:
- storing, in the memory, a reference 3D human body model which comprises a mean body shape; and
- generating, by the circuitry, the deformed 3D human body model based on deformation of the reference 3D human body model.

13. The method according to claim 10, further comprising, for each of the plurality of depth data points, calculating, by the circuitry, the first distance from the depth data point to the plane of the triangular face, based on a unit normal of the plane of the corresponding triangular face, the depth data point, and coordinates of vertices of the triangular face.

14. The method according to claim 10, further comprising, for each of the plurality of depth data points, determining, by the circuitry, whether the first point of projection of the depth data point is inside or outside the plane of the corresponding triangular face, based on barycentric coordinates of the corresponding triangular face.

15. The method according to claim 10, further comprising:
- for each of the plurality of depth data points:
  - determining, by the circuitry, whether the second point of projection of the depth data point is present in-between the end points of the corresponding edge based on the projection coefficient; and
  - determining, by the circuitry, the point-to-surface distance based on the determination that the second point of projection of the depth data point is present in-between the end points of the corresponding edge.

16. The method according to claim 10, further comprising, for each of the plurality of depth data points, calculating, by the circuitry, the projection coefficient based on the coordinates of the end points of the corresponding edge and the depth data point.

17. The method according to claim 10, further comprising controlling a display device to display the reconstructed 3D model of the human subject such that the plurality of point-to-surface distances between the plurality of depth data points and the surface of the deformed 3D human body model is minimized at a rendered state of the reconstructed 3D model of the human subject on the display device.

18. The method according to claim 17, wherein the plurality of point-to-surface distances between the plurality of depth data points and the surface of the deformed 3D human body model is minimized despite a reduction in a resolution of the plurality of vertices on the deformed 3D human body model, below a threshold at the rendered state of the reconstructed 3D human body model on the display device.

* * * * *